United States Patent [19]

King et al.

[11] 4,205,899
[45] Jun. 3, 1980

[54] OPTICAL CABLES

[75] Inventors: Frederick D. King, Smiths Falls; Tomasz S. Swiecicki, Pointe Claire, both of Canada

[73] Assignee: Northern Telecom Limited, Montreal, Canada

[21] Appl. No.: 913,819

[22] Filed: Jun. 8, 1978

[51] Int. Cl.$^2$ ............................ G02B 5/16; D02G 3/44
[52] U.S. Cl. ........................................ 350/96.23; 57/9; 264/45.9
[58] Field of Search ............... 350/96.23; 264/45.9; 57/9-12

[56] References Cited

U.S. PATENT DOCUMENTS

| | | | |
|---|---|---|---|
| 3,498,286 | 3/1970 | Polanyi et al. | 350/96.23 |
| 4,028,081 | 6/1977 | Marcatili | 350/96.23 |

FOREIGN PATENT DOCUMENTS

| | | | |
|---|---|---|---|
| 2519050 | 11/1976 | Fed. Rep. of Germany | 350/96.23 |
| 2312788 | 12/1976 | France | 350/96.23 |

*Primary Examiner*—Stewart J. Levy
*Attorney, Agent, or Firm*—Sidney T. Jelly

[57] ABSTRACT

An optical cable has a grooved central filament, the grooves following helical paths, the helices changing hand along the filament. In the manufacture of the filament, plastics is extruded past a fixed die and some way downstream, the filament is held and twisted first in one direction and then in the opposite direction so that the helical paths are introduced where the plastics exits the die. Dielectric optical waveguides are disposed in the grooves and the whole is surrounded by an extruded plastic sheath to produce an optical cable.

9 Claims, 6 Drawing Figures

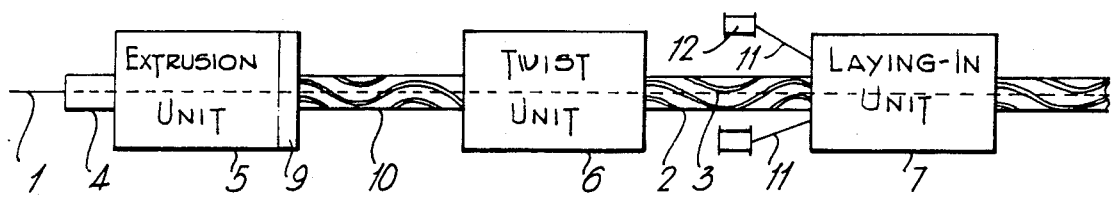

OPTICAL CABLES

This invention relates to a filament for use in optical cables, to optical cables utilizing the filament and to a method of manufacturing the filament.

It has been previously proposed to manufacture optical cable having a central strength member of, for example steel wire, a plastics outer sleeving extruded around the steel wire and a series of grooves formed in the surface of the plastic sleeving, each groove containing a dielectric optical waveguide.

In order to ensure that dielectric optical waveguides are not subject to destructive tensile and compressive stresses wherever the cable is bent, the grooves are made in helical form. Thus at a curved part of a cable a dielectric optical waveguide experiences alternately compression and tension and over the length of the curve, the stresses at least partially cancel out.

The manufacturing steps for such cable include production of a grooved, plastics-coated metal strength member to provide a central filament for the cable, and the laying of dielectric optical waveguides into the grooves in the central filament. In the former, a known practice is to extrude the plastics through a rotating die, a servo mechanism being utilized to maintain the correct ratio of die angular velocity to the extrusion rate of filament in order to maintain the pitch of the helices within a predetermined range throughout the length of the central filament. It is necessary to limit the extrusion rate in order to guard against adverse shear affects resulting when the plastics, as it is extruded in one direction, is directed rapidly in a different direction. Care must also be taken in choosing an extrusion rate to avoid collapse of the grooved structure immediately the malleable, high temperature plastics exits from the die.

To lay dielectric optical waveguides into an appropriately grooved central filament, a planetary stranding technique has been adopted. In such a technique for laying in, say ten dielectric optical waveguides, ten reels of dielectric optical waveguide are mounted on a rotatable jig with the central filament being led through the centre of the jig. The reels revolve around the longitudinally moving filament with an angular velocity commensurate with both the pitch of the helical grooves and the velocity of the central filament. In effect therefore a reel follows a groove around as the central filament is fed through the jig. A suitable locating device presses payed out dielectric optical waveguide into the grooves.

Rotation of the reels and their motion around the central filament does, however, introduce a twist into the laid dielectric optical waveguide which is unacceptable because of the internal stresses which result. To compensate for this the reels are themselves rotated so that the undesirable twist in the dielectric optical waveguide is pre-empted. The nature of the movement of the reels somewhat resembles a planet system and accounts for the name given to this technique.

It will be appreciated that a complex servo mechanism is required to correctly interrelate the speeds at which:

(1) the central filament is fed through the jig;
(2) dielectric optical waveguide is payed out;
(3) the jig is rotated, and
(4) the reels are rotated.

The optical cable structure of the invention permits the simplification of operating techniques for manufacture of the cable.

In addition, contrasting with known helical-lay optical cable, the manner in which dielectric optical waveguides are layed up in the proposed structure inhibits the damage from being caused through the cable twisting.

According to a first aspect of the invention there is provided an elongate filament for an optical cable, the filament comprising a central wire strength member, the central strength member being surrounded by a plastic sheath, said sheath having a surface, in which surface are defined a plurality of grooves, said grooves each having the form of a helix, each said helix periodically changing hand or thread direction along the filament.

In a second aspect of the invention, apparatus for making the filament comprises an extrusion unit for continuous extrusion of heated, malleable plastics material through a fixed die having a plurality of fingers to form said grooves, a twist unit located downstream of said extrusion unit, said twist unit having a reciprocally rotatably driveable hollow cylindrical member for receiving the extruded material with at least some of the grooves engaging the member, the twist unit being driveable to twist the extruded material thereby to introduce a helical form to the grooves where extruded material exits the extruded unit. A link mechanism interadjacent the extrusion unit and the twist unit can relate reciprocal rotation of the cylindrical member to the rate of extrusion of said plastic material. The location of the twist unit along a feedpath for the extruded filament is chosen to be where the filament is comparatively rigid and can support the engagement of, for example, inwardly projecting fins on the cylindrical member within the grooves. Such fins can have blades or wheels of sufficiently narrow thickness that they may be inserted within the grooves.

Alternatively the filament is gripped by a plurality of resilient wheels rotatably mounted on a jig, itself having a centre of rotation coincident with a central axis of the filament. The resilient wheels are arranged to bear against the filament with sufficient pressure to grip the filament but insufficient pressure to permanently distort the grooves.

The invention also extends to a method of operating the apparatus and to an optical cable filament produced by said method, the method comprising: feeding a strength member through the die aperture contemporaneously with extruding plastics through the multi-fingered aperture to surround the strength member with a plastics sheath having a groove surface; operating said engaging means to engage the filament at a location remote from said die where the extruded plastics is relatively rigid; and reciprocably driving said twist means to impart a helical form of periodically changing hand to the grooves where extruded plastics exits the fixed die.

In preferred embodiments of the filament, at least one complete pitch of a particular helix exists between each change of hand thereof and respective helices all change hand in the same sense at predetermined positions along the filament. It is preferred that the helices change hand at regular intervals along the length of the filament. In a typical optical cable structure, the filament composition is high density polyethylene surrounding a central strength member, dielectric optical waveguides being positioned in the grooves, and an outer plastics sheath surrounding the filament.

An embodiment of the invention will be described by way of example with reference to the accompanying drawings, in which:

FIG. 1 is a perspective view of a length of filament according to the invention;

FIG. 2 is a schematic representation of apparatus for making such a filament and laying dielectric optical waveguides into grooves in the filament;

FIGS. 3 and 4 are respectively a perspective view and an end view of part of the apparatus for twisting extruded material to produce the filament; and FIGS. 5 and 6 are a perspective view of apparatus for laying dielectric optical waveguides into the filament.

Referring to the drawings in detail, a filament for an optical cable has a central steel wire strength member 1 and, extruded over the strength member 1, a sleeve 2 of high density polyethylene. Formed in the surface of the sleeve and extending throughout the length of the filament are a number, in this case four, circumferentially spaced grooves 3a, 3b, 3c and 3d. In use the grooves each accommodate a dielectric optical waveguide in a relatively loose fit, the whole being surrounded by an extruded plastics sheath (not shown). In order to guard against breakage of dielectric optical waveguides where the optical cable is bent, the grooves are made to follow a helical path around the longitudinal axis of a filament. However, as shown at positions 4 the various helical paths followed by the grooves change hand or thread direction (left to right or right to left) or lay direction. The grooves 3 are advantageously distributed evenly around the filament so the changes of hand of the four helical paths take place at the same specific positions along the length of the filament. The grooves thus have a generally parallel disposition relative to one another. As is evident from FIG. 1 the changes of hand take place at regular intervals along the filament.

Turning to FIG. 2, there is shown a schematic representation of apparatus used in the manufacture of an optical cable utilizing the filament described. Basically the apparatus comprises three units, an extrusion unit 5, a twist unit 6, and a laying-in unit 7. To manufacture, steel wire core 1 and a charge of high density polyethylene 8 are fed into an extrusion unit which includes a die 9 shown in greater detail in FIG. 3. The polyethylene 8 is heated until it is malleable and then extruded around the steel wire core 1 through the die 9 which is shaped to form grooves 10 in the polyethylene as it exits the extrusion unit 5. Some way downstream of the extrusion unit, the filament, having been cooled by a trough of cooling fluid (not shown) becomes relatively rigid and enters the twist unit which is operable to twist the filament, therefore introducing the helical form to the grooves where the polyethylene exits the extrusion unit.

Downstream of the twist unit 6 is the laying-in unit at which dielectric optical waveguide 11 which is payed out from reels 12 is set into the grooves 3.

Referring to the more detailed FIG. 3, molten polyethylene is extruded through the die 9 which has four inwardly projecting straight-walled fingers 13 to form the grooves 3. A twist unit 6 comprises a mechanism having a central cylindrical bore through which the extruded filament is pulled, the mechanism having at one end a gear 14 which is reciprocally rotatable and is driven by a drive gear 15 which forms part of a drive train from the extrusion unit, this being shown schematically by arrows B and C and drive shaft 16, the function of the drive train being to relate the speed of oscillation of the gear 14 to the extrusion rate of the extrusion unit 5. Alternatively the rates of extrusion and drive to the twist unit can be preset to obtain the required groove characteristics without the drive train B and C.

Integral with, and adjacent gear 14, is a barrel member 16 having a series of four evenly circumferentially spaced slots 17 extending through its wall. Slidably mounted within the slots for limited radiant movement are four fins 18 having blades 19 of thin cross-section at their inner edges which project into the barrel 16. Outer edges 20 of the fins 18 are biased radially inwardly by a spring 21.

In operation of the twist unit 6, the blades 19 interengage in respective ones of the four grooves 3 where the extruded plastics is relatively cool and rigid and the drive train, via the gear 14, drives the barrel 16 to twist the filament 2. Since the extrusion unit does not rotate, the extruded polyethylene between the two units 5 and 6 undergoes a shear stress resulting in the grooves in the most malleable part of the polyethylene, i.e. as it exits from the extrusion unit 5, being deformed to provide the helical character. The change in hand of the individual helices is achieved merely by reversing the drive direction of the drive train.

The blades 19 are in an alternative embodiment, (not shown), replaced by miniature wheels which run in the grooves 3 in the filament 2 with somewhat less friction than do the blades 19.

In another alternative (not shown) the filament is gripped at its surface by three wheels of resilient composition. The arrangement is such that the wheels bear sufficiently strongly on the filament that it can be twisted by the twist unit but insufficiently strongly for the grooved surface structure to be permanently distorted.

FIG. 4 shows a practical embodiment of the unit 7 for laying dielectric optical waveguides 11 into the grooves 3 of a filament 2. Dielectric optical waveguide is payed out from four reels 12 which are evenly circumferentially spaced away from a path 21 along which the grooved filament 2 is drawn. The dielectric optical waveguides 11 are pulled from the reels by the movement of the filament itself as will be explained presently. The dielectric optical waveguides 11 pass through guide means comprising a pair of rotatable plates 22 and 23. The filament 2 is drawn through the centre of the two plates while the dielectric optical waveguides pass through the plates at circumferential evenly spaced apertures 24 and 25. The plate 23 is somewhat thicker than plate 22 and the apertures 25 are lined with tubes 26 which project from the downstream side of the plate 23. The tubes 26 are inclined towards the axis of the filament 2 and their ends 27 are flexible and pressed into respective grooves 3 so that as dielectric optical waveguide is drawn from the tubes by the filament being drawn past the laying-in unit 7, the dielectric optical waveguides are automatically located in the bases of the grooves 3. To aid the drawing out of dielectric optical waveguide, the outlet ends of the tubes are tapered, the tapered surface facing radially outward. In addition, the inlet ends of each of the tubes can be formed with a mouthpiece (not shown) to reduce friction effects where dielectric optical waveguide enters the tubes.

The circumferential position of the grooves 3, where they are engaged by tube ends 27, regulate the angular position of the plate 23. A geared drive shown schematically as arrow D relates the rotation of plate 22 to that of plate 23.

In operation the movement of filament 2 past the tube ends 27 produces rotation of plate 23 determined by the number of times a helical groove 3 extends around the longitudinal axis of the filament 2 between adjacent changes of hand or lay direction. The purpose of the second plate 22 is to prevent the four fibres from contacting each other and the central filament. The latter is undesirable since friction effects would make the pulling of fibre from the fixed reels 12 much more difficult. The presence of the plate 22 permits a phased winding of the dielectric optical waveguides 11 around each other and the central filament 2, but without there being any contact. If a number of turns are envisaged between each change of hand of the helical grooves 3 then a number of intermediate plates 22 can be sited between the plate 23 and the reels 12 with an appropriate gear drive.

In the embodiment described the drive is such as to produce angular rotation of $\theta/2$ of plate 22 for every angular rotation $\theta$ of the plate 23.

What is claimed is:

1. Apparatus for making an optical cable filament comprising extrusion means having a fixed die formed with a multi-fingered aperture to impart a grooved surface to plastics extruded therethrough, twist means located downstream of said extrusion means, said twist means having a member mounted for reciprocal rotation about a feedpath for the filament, the member having engaging means for engaging the filament and being driveable to twist the filament to impart a helical form to the grooves where extruded plastics exits the die.

2. Apparatus as claimed in claim 1, the engaging means comprising a plurality of inwardly spring-biased fins formed at inner edges thereof with narrow section blades adapted to engage in respective grooves in the filament.

3. Apparatus as claimed in claim 1, the engaging means comprising a plurality of inwardly spring-biased fins having wheels of narrow section mounted at their inner edges adapted to locate in respective grooves in the filament.

4. Apparatus as claimed in claim 1, in which the engaging means comprises a plurality of wheels adapted to grip a filament at its surface with gripping forces sufficient to twist the filament but insufficient to permanently distort the grooved surface form of the filament.

5. Apparatus as claimed in claim 1 further comprising a cooling trough between the extrusion means and the twist means to cool extruded filament, the filament thereby being sufficiently rigid at the twist means to permit engagement thereof by said engaging means.

6. Apparatus as claimed in claim 1 further comprising a link mechanism interadjacent the extrusion means and the twist means relating reciprocal rotation of the member to the rate of extrusion of said plastics.

7. A method of operating the apparatus of claim 1 to make an optical cable filament the method comprising:
feeding a strength member through the die aperture contemporaneously with extruding plastics through the multi-fingered aperture to surround the strength member with a plastics sheath having a grooved surface;
operating said engaging means to engage the filament at a location remote from said die where the extruded plastics is relatively rigid; and
reciprocably driving said twist means to impart a helical form of periodically changing hand to the grooves where extruded plastics exits the fixed die.

8. A method as claimed in claim 7, in which said strength member is a wire fed through the centre of the die aperture.

9. An optical cable filament made by the method of claim 7 or 8.

* * * * *